Nov. 8, 1955  W. H. PETIT  2,723,169
BEARING CONSTRUCTION
Filed March 31, 1953  3 Sheets-Sheet 1
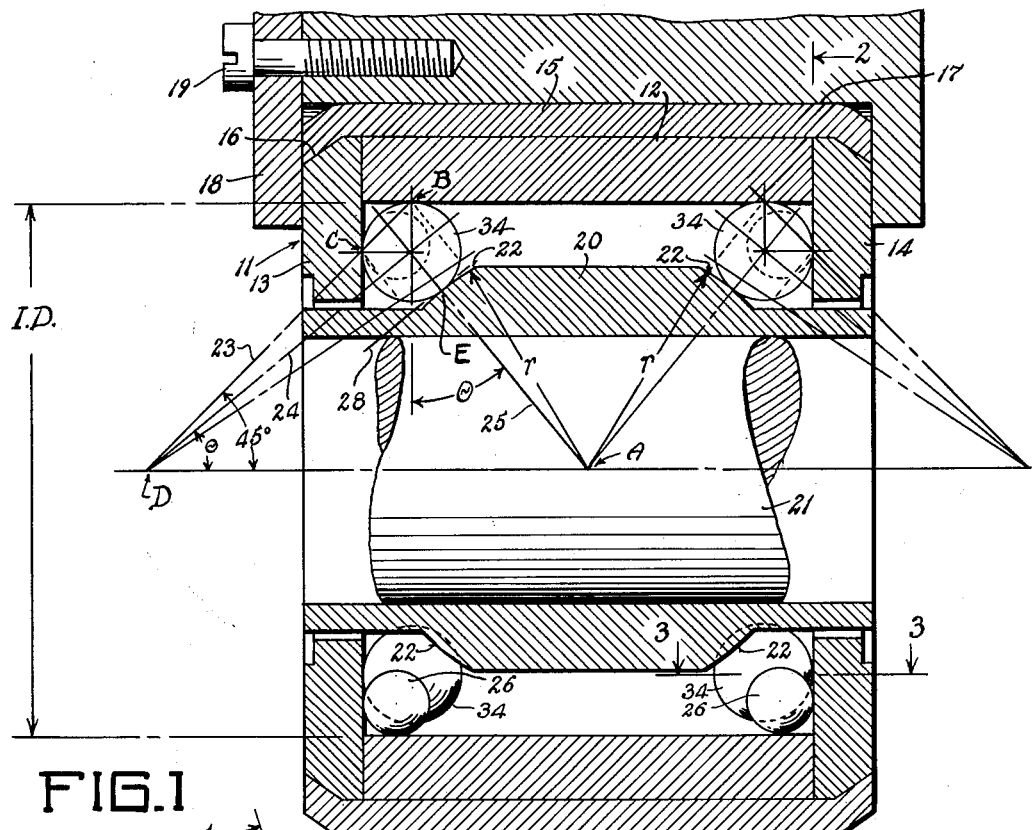
FIG.1
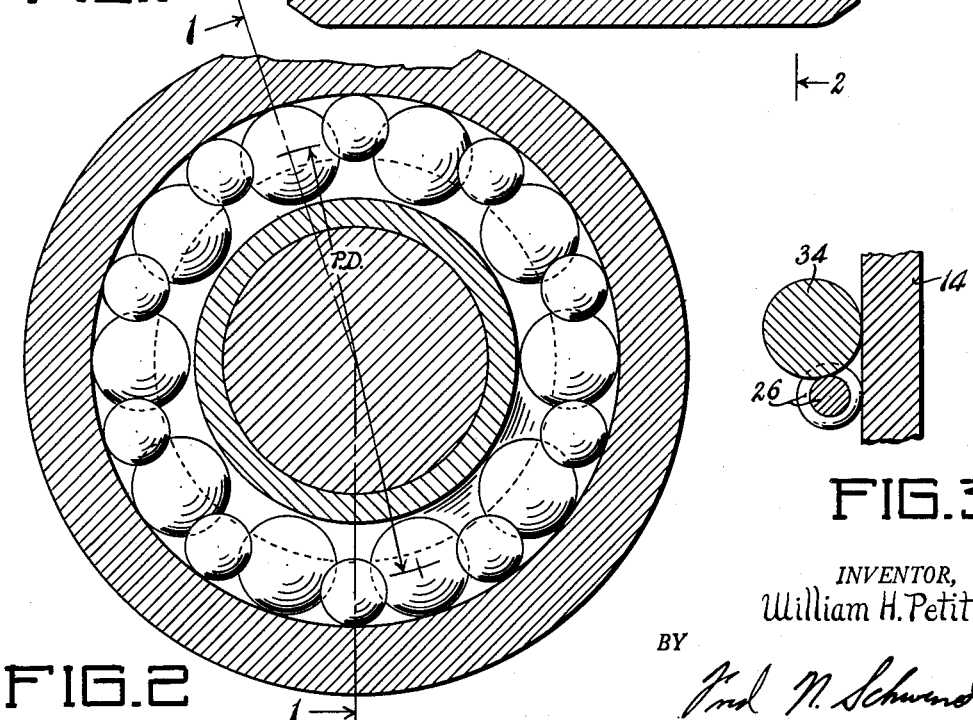
FIG.2
FIG.3
INVENTOR,
William H. Petit
BY
*Fred N. Schwend*
ATTORNEY.

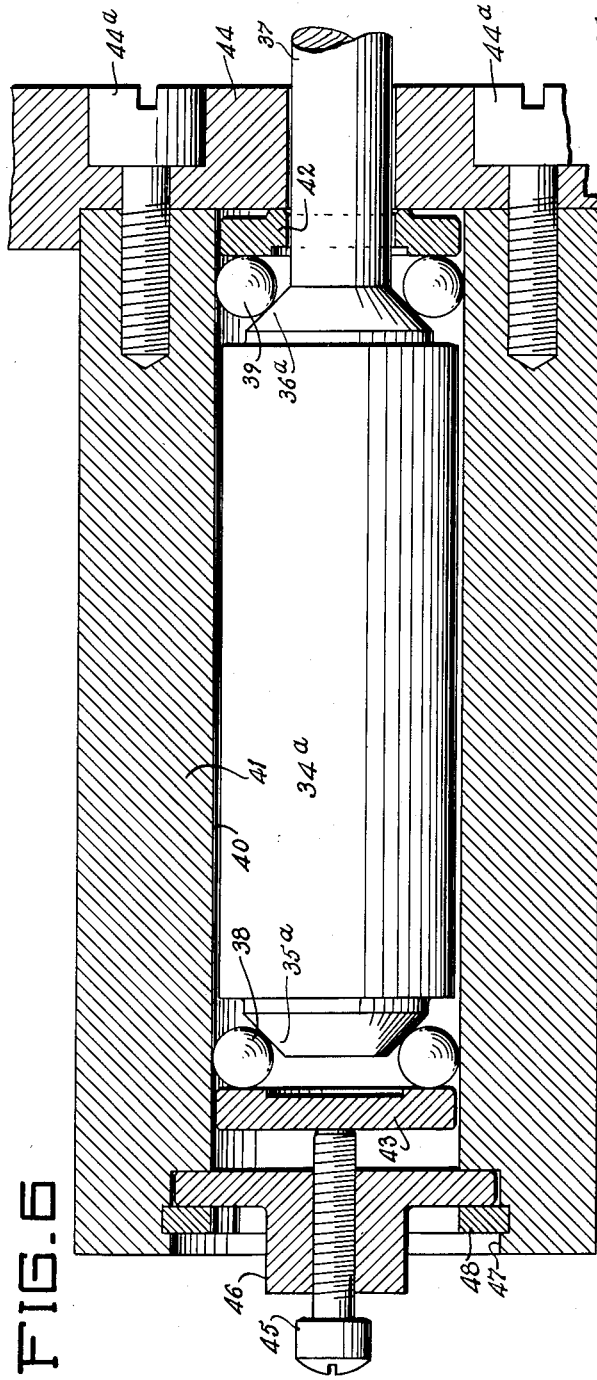
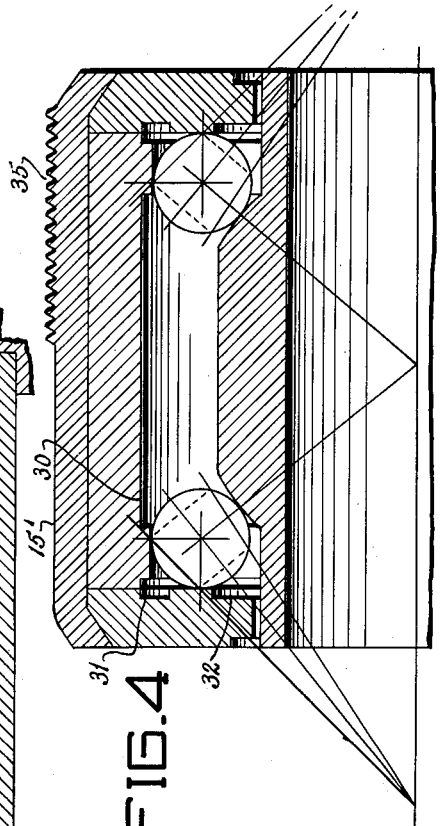
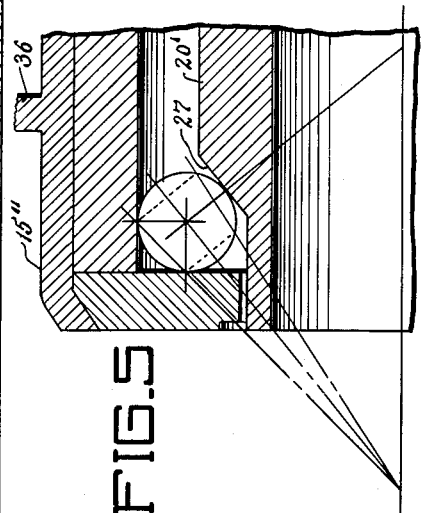

INVENTOR,
William H. Petit
BY
Fred N. Schwend
ATTORNEY.

United States Patent Office 2,723,169
Patented Nov. 8, 1955

2,723,169

BEARING CONSTRUCTION

William H. Petit, Pasadena, Calif., assignor to Clary Corporation, a corporation of California Application March 31, 1953, Serial No. 345,810

9 Claims. (Cl. 308—195)

This invention relates to ball bearings of the three-point contact type capable of supporting combined radial and thrust loads.

In bearings constructed for precision equipment and instruments such as gyroscopes, it is essential that friction between the rotating and stationary elements of the bearing be reduced to a minimum so as not to detrimentally affect operation of the device.

Heretofore, bearings of the above three-point type have been constructed using an arbitrarily selected conical angle or tangent contact angle for the inner bearing race. Such bearings, although satisfactory for general use, have been found to impart a certain amount of friction which was reflected in errors in drift and precession in the application of such bearings to gyroscope instruments.

Applicant has discovered that this friction thus developed is the result of the balls skidding or scuffing on one or the other of the ball raceways, or, in other words, that the balls do not exhibit a true rolling action at all three points of engagement with the bearing raceways.

Applicant has further discovered that in order to obtain such true rolling action, a definite relationship must exist between the diameter of the outer bearing raceway, the diameters of the balls, and the angle or tangent contact angle of the inner bearing raceway.

It therefore becomes a principal object of the present invention to provide a ball bearing of the three-point type in which the balls exhibit a true rolling contact over the raceways.

Another object is to provide a bearing of the above type which is self-aligning.

Another object is to eliminate the need for a ball retainer or spacer cage in bearings of the above type.

A further object is to provide a ball bearing in which the inner race and outer race have the least possible axial freedom with respect to each other and still have complete freedom of rotation.

The manner in which the above and other objects of the invention are accomplished will be readily understood on reference to the following specification when read in conjunction with the accompanying drawings wherein:

Fig. 1 is a longitudinal sectional view of a self-aligning ball bearing constructed according to the present invention.

Fig. 2 is a transverse sectional view of the self-aligning bearing and is taken along the line 2—2 of Fig. 1.

Fig. 3 is a sectional plan view taken along line 3—3 of Fig. 1.

Fig. 4 is a longitudinal sectional view, partly broken away, of a modified form of the self-aligning bearing of Fig. 2.

Fig. 5 is a longitudinal sectional view, partly broken away, through a non-self-aligning bearing embodying another modified form of the present invention.

Fig. 6 is a longitudinal sectional view through a rotary device embodying ball bearings constructed according to the present invention.

Figure 7:
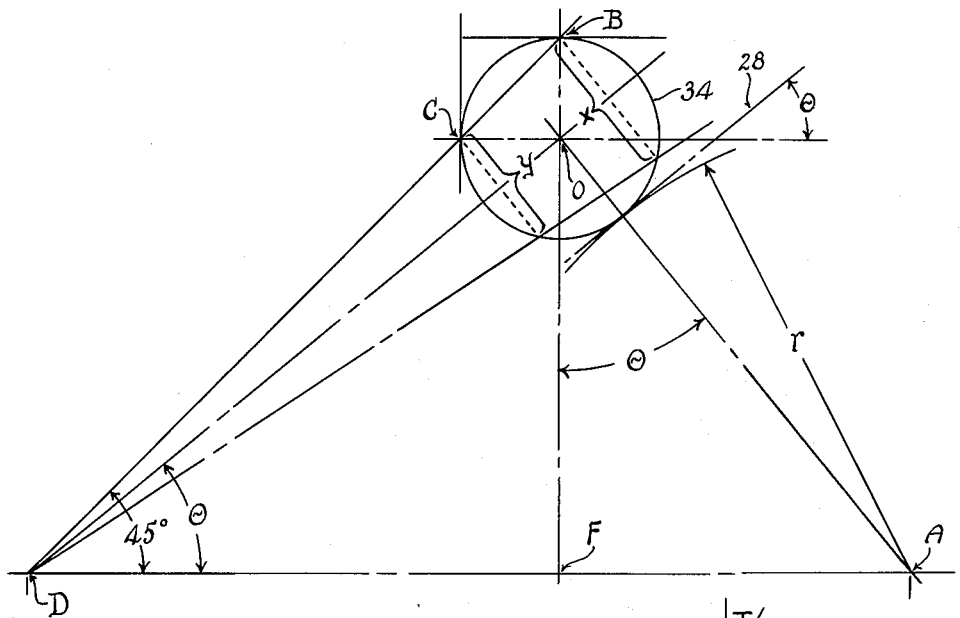
Fig. 7 is a diagrammatic illustration showing the manner of constructing the ball raceways.

Referring particularly to Figs. 1 and 2, the ball bearing illustrated therein comprises a composite outer race member, generally indicated at 11. The latter is constructed of a cylindrical outer race element 12, against the ends of which abut a pair of annular end plates 13 and 14 forming end races for two rows of load supporting balls 34. The end plates 13 and 14 are retained in place by a sleeve 15 fitted over the member 12 and coined or otherwise formed over chamfered edges 16 formed on the outer edges of the plates 13 and 14. The outer race member 11 is removably secured in a suitable frame socket 17 by a retainer plate 18, the latter being held in place by bolts 19.

An inner race member or rotor 20 is provided to rotatably support a rotor shaft 21 and is suitably secured thereto in a manner not shown. Member 20 is provided with a spherical ball race surface 22, the center of radius of which is located on the axis of shaft 21 at point A.

As noted heretofore, the diameters of the balls bear a definite relationship to the inner diameter of the race element 12 and to the radius $r$ of the spherical race portion 22 of the rotor 20. Likewise, the distance between the two rows of balls, measured axially of shaft 21, bears a definite relationship to the remaining factors, as will appear hereinafter.

According to the present invention, and referring particularly to Figs. 1 and 7, the size and shape of the balls and raceways are determined as follows: After selecting a desired diameter of load carrying ball 34, and inside diameter of race element 12, a line 23 is passed through the points of contact B and C between a ball 34 and race element 12 and adjacent end plate 13 or 14, respectively. Such line normally extends at 45° to the axis of rotation of shaft 21, intersecting the latter at point D. A second construction line 24 is now extended through the center of the ball 34 and through the point of intersection D. The latter line determines the location of the axis of rotation of the ball 34. A line 25 is projected from the center of the ball 34 at an angle of 90° from the axis of rotation of the ball to intersect the axis of shaft 21 at A, which is the center of the radius $r$. The radius $r$ is now struck off about center A, contacting the ball 34 at E.

As shown in Fig. 7, the circular paths of rotation of ball 34 are indicated at X and Y, the latter contacting the raceways B and C, respectively. Thus, the relation of X to Y is as BF is to OF, and the radius of path X is equal to the cosine $\Theta \times OB$, while the radius of path Y is equal to the sine $\Theta \times OB$. Since $BF=DF$, then tangent $$\Theta = \frac{OF}{DF}$$

and $AF=$ tangent $\Theta \times OF$.

$$OA = \frac{OF}{\cosine \Theta}$$

and radius $r = OA - OB$.

Figure 8:
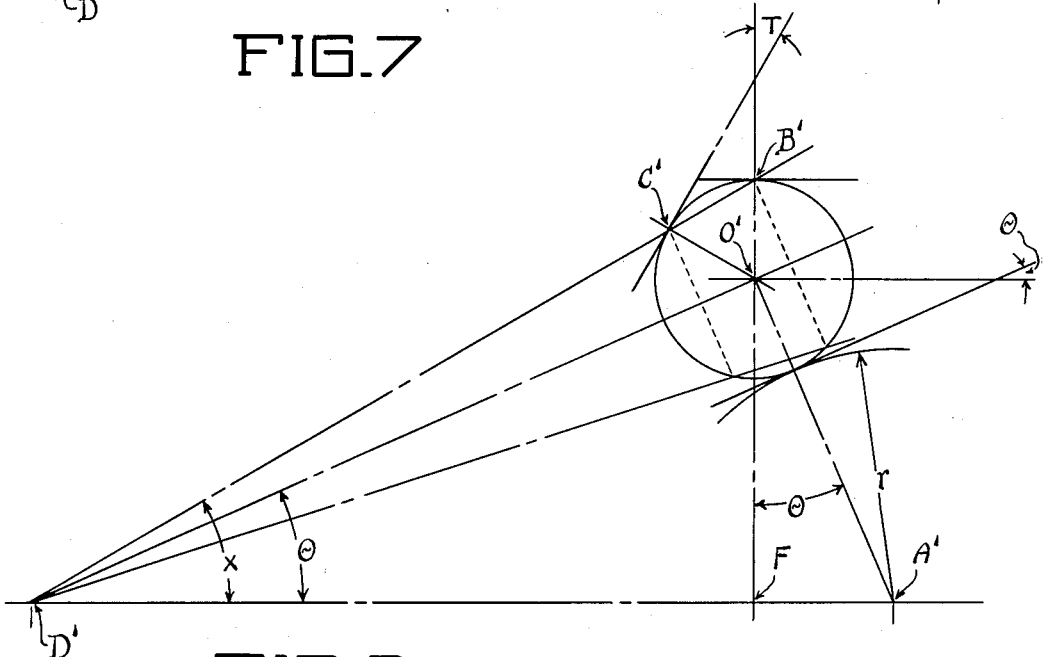
Fig. 8 is a diagrammatic illustration showing the manner of constructing the ball raceways in a modified form of the invention.

It is also possible to decrease the angle between the end plate, i. e., 13 or 14, and the axis of rotation of the inner member 20, as is shown in Fig. 8. In this modification $$X = \frac{90° - T}{2}$$

and $$D'F' = \frac{B'F'}{\text{tangent } X}$$

therefore, tangent $$\ominus = \frac{O'F'}{D'F'}$$

and $A'F' = O'F \times \ominus'$.

$$O'A' = \frac{O'F'}{\cos \ominus'}$$

and $r' = O'A' - O'B'$.

Theoretically, and in some cases practically, the bearing paths B and C could be or could approach lines or circles of contact only.

The same center A is used to construct the inner raceways for both rows of balls. Thus, a true rolling action will be followed by all of the load supporting balls since the axis of rotation of each ball is parallel to a line 28 tangent to the point of contact between the ball and the surface 22. In view of the spherical formation of the ball contacting surface 22, a true rolling action will be followed by the balls regardless of the angular relation of the shaft axis (within limits) relative to the axis of the outer race element 12.

Means are additionally provided for minimizing the friction normally resulting from the usual ball retainer or spacer cage while maintaining the load supporting balls at uniformly spaced positions around the raceways. For this purpose spacer balls 26 of somewhat smaller diameter than the load carrying balls 34 are provided, one being located between each pair of adjacent ones of the latter balls. Such spacer balls, by virtue of their smaller diameters, are held by the balls 34 in pockets located between the respective end plates, the outer race element 12 and the load supporting balls. The spacer balls exhibit a rolling contact with the adjacent load bearing balls 34.

Since the bearing raceways provided by the element 12 and the end plates 13 and 14 approach a line contact, the remainder of the elements and the platen may be relieved as indicated at 30, 31 and 32 (Fig. 4) to reduce the amount of surface requiring grinding, honing or other types of fine finishing necessary to construct the bearing raceways. Also, the sleeve 15′ may be provided with a threaded outer periphery 35 whereby the same may be threadably secured in a corresponding bore of a supporting element.

Fig. 5 illustrates a non-self-aligning ball bearing constructed in a manner similar to the bearing shown in Figs. 1 and 2. However, the raceway 27 of the inner member 20′ is formed to define a cone extending at an angle equal to the contact tangent line 28 (Fig. 1) of the roller race surface 22. Therefore, a true rolling action exists, as long as the axis of the inner bearing member 20′ remains parallel and coincident with the axis of the outer bearing member. In this construction, also, a flange 36 is formed integral with the sleeve 15″ for attachment to the side of a supporting element for the bearing.

Fig. 6 illustrates an application of non-self-aligning bearings of the type shown in Fig. 5. In this case, a rotor 34a is provided having conical bearing surfaces 35a and 36a developed in a manner similar to that of 27 in Fig. 5. The rotor also has an extending shaft portion 37 integral therewith. Two sets of balls 38 and 39 roll on raceways provided by the surfaces 35a and 36a and also in raceways provided for by the cylindrical inner bore 40 of a stator element 41. End raceways are provided by end plates 42 and 43.

The plate 42 is annular in form and is loosely fitted in the bore 40, being retained in place by a cap 44 secured to the end of the stator element 41 by screws 44a. The plate 43 is loosely fitted in bore 40. The plate 43 is held in place by an adjusting screw 45 threaded axially through a retainer cap 46. The latter is held in place in a counterbore 47 formed in the stator element by a retaining ring 48.

By providing suitable clearance between the plates 42, 43 and the inner bore 40, such plates will be allowed to "float" within limits and thus take up positions influenced by the balls.

Adjustment of the bearing is effected by turning the screw 45 so that the proper clearance between the rotating elements may be obtained.

Although I have described my invention in detail in its preferred embodiment and therefore have used specific terms and languages herein, it is to be understood that the present disclosure is illustrative rather than descriptive and that changes and modifications may be resorted to without departing from the spirit or scope of the claims appended hereto. For example, the ball contacting surface 22 of Fig. 1 may be formed directly on the shaft 21. Also, the various elements 12, 13, 14 and 15 comprising the outer race assembly of Fig. 1 may be formed of a one-piece member.

Having thus described the invention, what I desire to secure by United States Letters Patent is:

1. A ball bearing comprising an outer bearing member having a first cylindrical inner bearing surface and a second bearing surface located in a plane at right angles to the axis of said first bearing surface, an inner bearing member having a third outer spherical bearing surface, and a plurality of balls in rolling engagement with said three bearing surfaces, the center of radius of said third bearing surface lying coincident with said axis and on a line intersecting the center of one of said balls, said line extending at right angles to a second line passing through the center of said ball and intersecting the axis at a point coincident with a third line passing through the points of contact of said ball with said first and second bearing surfaces.

2. A ball bearing comprising an outer bearing member having a first cylindrical inner bearing surface and a second bearing surface located in a plane at right angles to the axis of said first bearing surface, an inner bearing member having a third outer bearing surface, and a plurality of balls in rolling engagement with said three bearing surfaces, a line passing through said third bearing surface longitudinally of the axis of said bearing and at a point tangent to the engaging surface of one of said balls extending parallel to a line passing through the center of said ball and intersecting said axis at a point coincident with a second line passing through the points of contact of said ball with said first and second bearing surfaces.

3. A ball bearing comprising an outer bearing member having a first cylindrical inner bearing surface and a second bearing surface located in a plane at right angles to the axis of said first bearing surface, an inner bearing member having a third outer bearing surface, and a plurality of balls in rolling engagement with said three bearing surfaces, a line passing through the center of any of said balls and the point of contact of said ball and said third bearing surface being perpendicular to a line passing through said ball center and intersecting said axis at a point coincident with a second line passing through the points of contact of said ball with said first and second bearing surfaces.

4. A ball bearing comprising an outer bearing member having a first cylindrical inner bearing surface, said bearing member having spaced second and third bearing surfaces located in respective planes extending at right angles to the axis of said first bearing surface, an inner bearing member having a fourth outer spherical bearing surface located between said second and third bearing surfaces, a set of balls in rolling engagement with said first, second and fourth bearing surfaces, a second set of balls in rolling engagement with said first, third and fourth bearing surfaces, said center of radius of said spherical bearing surface lying coincident with said axis and on a line intersecting the center of one of said first set of balls, said line extending at right angles to a second line passing through the center of said ball and intersecting said axis at a point coincident with a third line passing through the points of contact of said ball with said first and second bearing surface, said center of radius also lying coincident with a fourth line intersecting the center of one of said second set of balls, said fourth line extending at right angles to a fifth line passing through the center of said last-mentioned ball and intersecting said axis at a point coincident with a sixth line passing through the points of contact of said last-mentioned ball with said first and third bearing surfaces.

5. A ball bearing comprising an outer bearing member having a first bearing surface defining a first circle of contact and a second bearing surface defining a second circle of contact concentric with the axis of said first circle of contact, an inner bearing member having a third bearing surface defining a third circle of contact, and a plurality of balls in rolling engagement with said three circles of contact, a line passing through said third circle of contact longitudinally of said axis and at a point tangent to the engaging surface of one of said balls extending parallel to a line passing through the center of said balls and intersecting said axis at a point coincident with a second line passing through the point of contact of said ball with said first and second circles of contact.

6. A ball bearing comprising an outer bearing member having a first circular inner bearing surface and a second bearing surface located in a plane of revolution having its axis coincident with the axis of said first bearing surface and extending at an angle thereto, an inner bearing member having a third outer bearing surface, and a plurality of balls in rolling engagement with said three bearing surfaces, a line passing through said third bearing surface longitudinally of the axis of said bearing and at a point tangent to the engaging surface of one of said balls extending parallel to a line passing through the center of said ball and intersecting said axis at a point coincident with a second line passing through the points of contact of said ball with said first and second bearing surfaces.

7. A ball bearing comprising an outer cylindrical bearing member presenting a first inner bearing surface, end bearing members engaging opposite ends of said outer bearing member, said end bearing members presenting second and third bearing surfaces, respectively, a housing element maintaining said bearing members in relatively fixed relationship, an inner bearing member presenting a fourth outer spherical bearing surface, a set of balls in rolling engagement with said first, second and fourth bearing surfaces, a second set of balls in rolling engagement with said first, third and fourth bearing surfaces, the center of radius of said fourth bearing surface lying coincident with the intersection of the axis of said inner bearing member and a line extending through the center of one of said first set of balls, said line extending at right angles to a second line passing through the center of said ball and intersecting the axis of said outer bearing member at a point coincident with a third line passing through the points of contact of said ball with said first and second bearing surfaces, said center of radius also lying coincident with a fourth line intersecting the center of one of the second set of balls, said fourth line extending at right angles to a fifth line passing through the center of said last mentioned ball and intersecting said axis of said outer bearing member at a point coincident with a sixth line passing through the points of contact of said last mentioned ball with said second and third bearing surfaces.

8. A ball bearing comprising a tubular bearing member presenting a first cylindrical inner bearing surface, end bearing members engaging opposite ends of said tubular bearing member, said end bearing members presenting second and third bearing surfaces, respectively, extending at right angles to the axis of said cylindrical bearing surface, a housing element fastening said bearing members in relatively fixed relationship, an inner bearing member presenting a fourth outer spherical bearing surface, a set of balls in rolling engagement with said first, second and fourth bearing surfaces, a second set of balls in rolling engagement with said first, third and fourth bearing surfaces, the center of radius of said fourth bearing surface lying coincident with the intersection of the axis of said inner bearing member and a line extending through the center of one of said first set of balls, said line extending at right angles to a second line passing through the center of said ball and intersecting the axis of said outer bearing member at a point coincident with a third line passing through the points of contact of said ball with said first and second bearing surfaces, said center of radius also lying coincident with a fourth line intersecting the center of one of the second set of balls, said fourth line extending at right angles to a fifth line passing through the center of said last mentioned ball and intersecting said axis of said outer bearing member at a point coincident with a sixth line passing through the points of contact of said last mentioned ball with said second and third bearing surfaces.

9. A ball bearing comprising a tubular bearing member presenting a first cylindrical inner bearing surface, end bearing members engaging opposite ends of said tubular bearing member and presenting second and third bearing surfaces, respectively, extending at right angles to the axis of said tubular bearing member, a housing element fastening said bearing members in relatively fixed relationship, an inner bearing member presenting a fourth outer bearing surface, a set of balls in rolling engagement with said first, second and fourth bearing surfaces, a line passing through said fourth bearing surface longitudinally of the axis of said bearing and at a point tangent to the engaging surface of one of said balls extending parallel to a line passing through the center of said ball and intersecting the axis of said bearing at a point coincident with a second line passing through the points of contact of said ball with said first and second bearing surfaces, said inner bearing member presenting a fifth outer bearing surface, a second set of balls in rolling engagement with said first, third and fifth bearing surfaces, a line passing through said fifth bearing surfaces longitudinally of the axis of said bearing and at a point tangent to the engaging surface of one of said second set of balls extending parallel to a line passing through the center of said last mentioned ball and intersecting the axis of said bearing at a point coincident with a fourth line passing through the points of contact of said last mentioned ball with said first and third surfaces.

References Cited in the file of this patent

UNITED STATES PATENTS

| | | |
|---|---|---|
| 898,945 | Weibel-Mulisch | Sept. 15, 1908 |
| 1,379,945 | Teetsaw | May 31, 1921 |
| 2,648,025 | Agule | Aug. 4, 1953 |

FOREIGN PATENTS

| | | |
|---|---|---|
| 1,849 | Great Britain | 1906 |
| 255,721 | Great Britain | July 29, 1926 |
| 18,524 | Denmark | June 7, 1913 |
| 713,619 | Germany | Nov. 12, 1941 |
| 977,603 | France | Nov. 15, 1950 |